July 29, 1941.　　B. LOEFFLER　　2,251,143
CLUTCH
Filed Dec. 8, 1938　　2 Sheets-Sheet 1

INVENTOR.
Bruno Loeffler,
BY
ATTORNEYS

July 29, 1941.    B. LOEFFLER    2,251,143
CLUTCH
Filed Dec. 8, 1938    2 Sheets-Sheet 2

INVENTOR.
*Bruno Loeffler,*
BY
ATTORNEYS

Patented July 29, 1941

2,251,143

UNITED STATES PATENT OFFICE 2,251,143

CLUTCH

Bruno Loeffler, Plainfield, N. J., assignor to Mack Manufacturing Corporation, Long Island City, N. Y., a corporation of Delaware Application December 8, 1938, Serial No. 244,529

14 Claims. (Cl. 192—68)

This invention relates to clutches for power operated machinery and relates particularly to improvements in clutches of the type having a plurality of levers and cooperating fulcrums that disengage cooperating friction clutch elements in response to inward movement of an actuating collar.

An object of the invention is to provide a simple and efficient lever and fulcrum construction for disengaging the friction elements of a clutch.

Another object of the invention is to provide lever and fulcrum constructions for clutches that can be accurately adjusted to insure equal distribution of stresses and uniform release of the cooperating friction elements of the clutches.

Another object of the invention is to provide clutches having levers and fulcrums wherein the levers are not subjected to heavy stresses to maintain the friction clutch elements in engagement, and any tendency of the clutch elements to release because of increased centrifugal force is avoided.

An additional object of the invention is to provide clutches having cooperating friction elements that are normally retained in engagement by means of elements independent of the clutch actuating levers.

A further object of the invention is to provide clutches having individually adjustable lever and fulcrum elements that allow accurate control of the movement of the levers, uniform distribution of operating stresses and compensation for wear on the various elements of the clutches.

Other objects of the invention will be apparent from a description of a typical form of the invention.

Clutches embodying the present invention comprise cooperating friction clutch elements, an axially shiftable pressure plate, resilient means for urging the pressure plate and friction elements into clutching engagement, a plurality of levers for withdrawing the pressure plate to release the clutch elements from clutching engagement, and adjustable connections between the pressure plate and the levers for allowing independent adjustment of the levers whereby they may act equally to withdraw the pressure plate.

For a better understanding of the invention, reference may be had to the accompanying drawings, in which.

Figure 1:
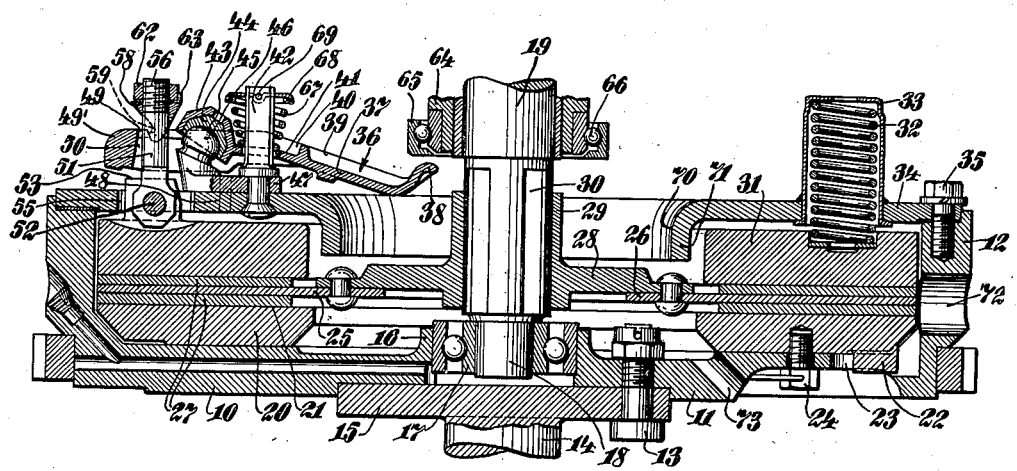
Figure 1 is a view in section of a typical form of device embodying the invention taken on line 1—1 of Figure 3.
Figure 2:
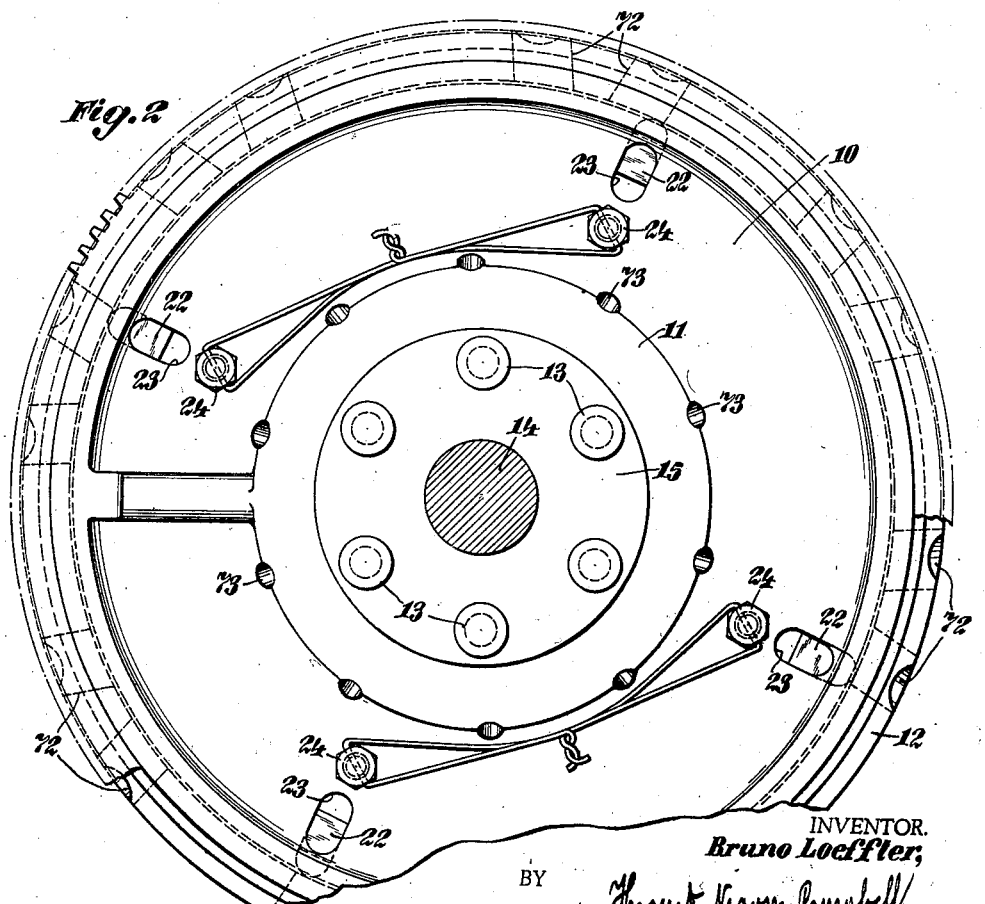
Figure 2 is a side view of the clutch partly broken away to show details thereof.
Figure 3:
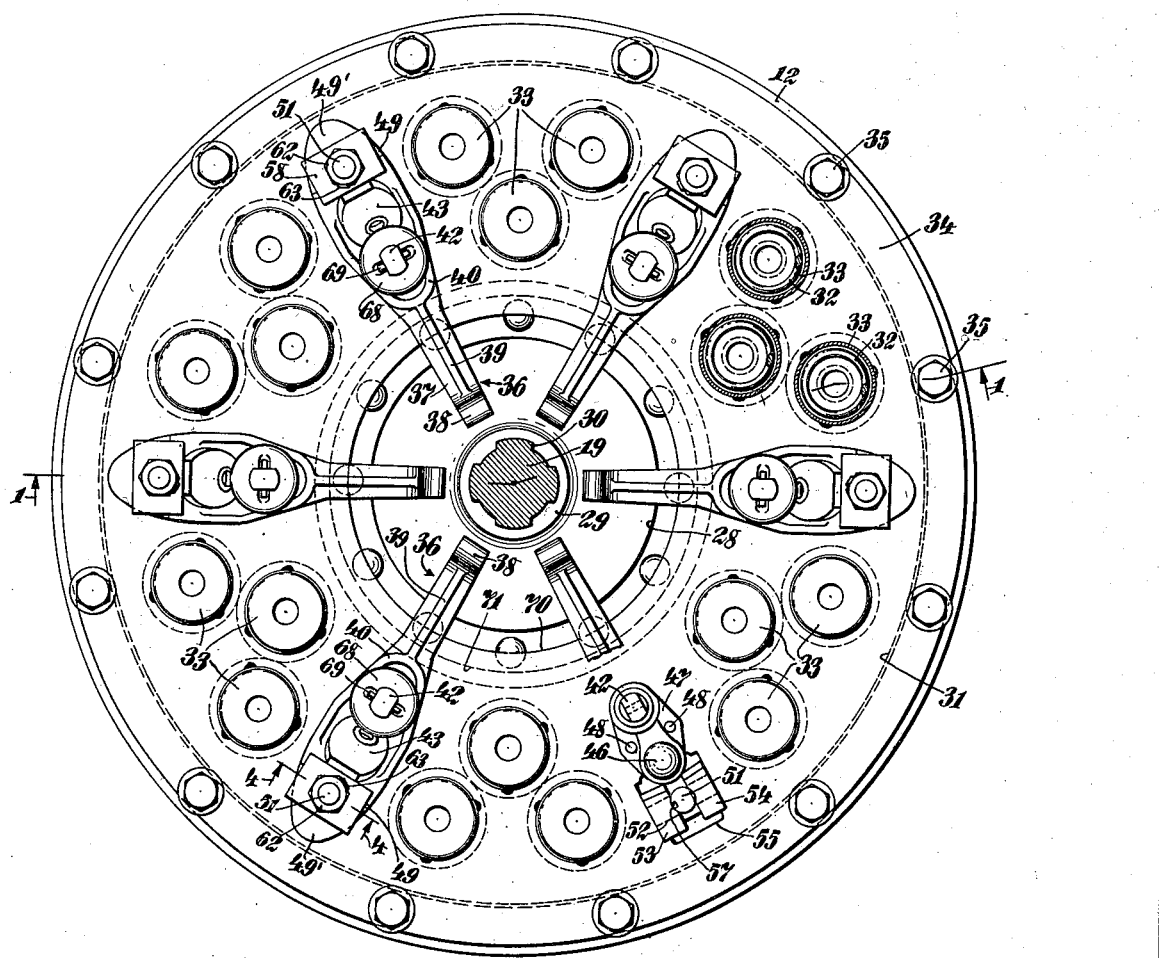
Figure 3 is a view of the opposite side of the clutch with one of the levers broken away to show details of the fulcrum construction.

The form of clutch illustrated in the drawings consists of a housing member 10 having a substantially disc-like end 11 and a peripheral and annular flange 12. The housing 10 may be fixed in any suitable way such as by means of bolts 13 to a drive shaft 14, said bolts passing through an end plate 15 on the drive shaft and through the end 11 of the housing. The housing 10 is provided with an inner annular flange 16 in which is mounted an anti-friction bearing 17 for the reduced end 18 of a driven shaft 19.

Fixed to the inner surface of the disc-like portion 11 of the housing 10 is a detachable friction clutch element 20 of annular formation and having a plane clutch face 21. The clutch element 20 is provided with outwardly projecting lugs 22 which are received closely in apertures 23 in the clutch housing 10 whereby relative rotation therebetween is prevented. The apertures 23 are longer than the lugs 22 and permit relative thermal expansion and adjustment of the clutch element 20 relatively to the housing 10. The clutch member 20 may be connected to the housing 10 by means of a plurality of set screws 24 which allow the clutch element 20 to be removed and resurfaced or replaced when worn. The apertures in the housing 10 through which the set screws 24 pass are of somewhat greater diameter than the set screws and also permit thermal expansion and shifting of the clutch element 20 relatively to the housing 10 to balance the assembly.

Cooperating with the clutch element 20 is a clutch element 25 consisting of an annular ring 26 having clutch facing material 27 on opposite sides thereof. The ring 26 is fixed to a laterally projecting flange 28 on a hub 29 which is nonrotatably but slidably mounted on the shaft 19 by means of splines 30.

An annular pressure plate 31 is disposed on the side of the clutch element 25 opposite from the clutch element 20 and when urged into engagement with the clutch element 25 connects the drive shaft 14 to the driven shaft 19. The pressures plate 31 is normally urged into clutching engagement with the clutch element 25 by means of a plurality of springs 32. The springs 32 are mounted in flanged cups 33 which are connected by welding, or in any other suitable way, to the cover plate or closure 34. The cover plate 34 is attached to the end of the flange 12 by means of a plurality of set screws 35 which permit ready removal of the cover plate when access to the interior of the housing is desired. The use of a plurality of springs engaging the pressure plate 31 results in uniform distribution of pressure throughout the entire area of the cooperating clutch elements 20 and 25 and pressure plate 31, and thereby assures intimate and uniform engagement between these elements.

Figure 4:
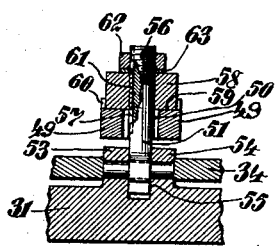
Figure 4 is a sectional view taken on line 4—4 of Figure 3.

The pressure plate 31 is withdrawn to release the clutch by means of a plurality of clutch actuating levers 36. Inasmuch as the levers and cooperating elements are identical in construction, only one lever assembly will be described. Each of the levers 36 consists of a long lever arm 37 having a reversely curved and outwardly directed end 38 formed of hardened material. The lever may be forged or cast as may be desired. The lever arm 37 is provided with an axially extending, reinforcing rib 39 which rigidifies and strengthens the lever without unnecessarily increasing its weight, said rib terminating in oval or diverging flanges 40 which encircle an aperture 41 through which passes a post 42 fixed to the cover plate 34. Adjacent the left-hand end of the lever, as viewed in Figure 1, is a cup-shaped element 43 having its axis inclined to the horizontal. The cup-shaped member 43 has an inner lining of bearing material 44 provided with a hemispherical inner surface 45 in which is received a complementary hemispherical or ball-like fulcrum member 46. The lever 36 is rockable on the ball fulcrum 46 substantially universally. The fulcrum member 46 projects inwardly at an angle to a plate 47 that is fixed to the cover plate 34. Because of the inclination of the fulcrum member 46 and the element 43, centrifugal force generated during rotation of the clutch tends to urge them into tighter engagement and prevents the lever from becoming detached from the housing. The plate 47 is fixed to the cover partially by means of the post 42 and one or more rivets or pins 48 which prevent relative movement between the cover plate 34 and the plate 47. The outer end or short arm of the lever 36 is provided with spaced-apart sidepieces 49 and a connecting endpiece 49' defining an aperture 50 through which passes the outer end of a link, such as eye-bolt 51. The inner end of the eye-bolt 51 is pivotally mounted on a pin 52 which extends between spaced lugs 53 and 54 that project from the outer surface of the pressure plate 31. The lugs 53 and 54 are so spaced that they closely engage the edges of an aperture 55 in the cover plate, thus coupling the pressure plate 31 to the housing 10 and cover plate 34 for rotation therewith but allowing relative axial movement therebetween. As best shown in Figures 1 and 4, the upper end of the eye-bolt 51 is provided with threads 56 and a longitudinally extending key-way 57. Mounted on the outer end of the eye-bolt 51 is a substantially wedge-shaped fulcrum element 58 having a rounded and angularly disposed lower fulcrum edge 59 which engages in notches or recesses 60 in the sidepieces 49 of the lever 36. The fulcrum member 58 is provided with a key 61 which is received in the key-way 57 and thus cannot rotate relatively to the eye-bolt 51. The fulcrum element 58 may be adjusted axially of the eye-bolt 51 by means of a nut 62 which is retained in adjusted position by means of a lock washer 63. By adjusting the fulcrum elements 58 axially of the eye-bolt the inner ends 38 of the levers 36 may be brought into any desired adjusted position for engagement with a ring 65 on a clutch actuating collar 64 which is shiftable axially of the shaft 19. The ring 65 which is L-shaped in cross-section is supported on the collar 64 by means of anti-friction bearings 66 whereby upon engagement of the ring 65 with the ends of the lever 38 it may rotate relatively to the shaft 19 and the collar 64.

In order to prevent unnecessary movement of the levers 36 and also to maintain them in their adjusted position, they may be engaged by a spring 67 which is mounted on the post 42 and normally urges the levers in clockwise direction, as viewed in Figure 1, about the fulcrum ball 46, thus exerting a light stress on the pressure plate and maintaining the lever 36 in engagement with fulcrum element 58. The spring 67 thus prevents swinging and rotating of the levers 36. The spring 67 is retained in compression on the post 42 by means of a cap washer 68 and a cross pin 69 extending through the post and over the washer.

The construction described above may be readily adjusted by means of the fulcrum elements 58 so that when the levers 36 are rocked by means of the clutch actuating collar 64 the pressure plate is withdrawn without rocking or without a greater stress being exerted on one lever than on the others. Likewise, as the clutch elements 25 and 20 and the pressure plate wear, these fulcrum elements may be adjusted to realign the inner ends of the levers. Wear on the fulcrum member and the levers may be compensated for by adjustment of the fulcrum element 58 which is at all times readily accessible.

Inasmuch as clutches tend to become heated during operation, provision is made for cooling clutches embodying the invention. The cover plate 34 is provided with a central opening 70 defined by an inwardly projecting flange 71 and the wall 12 of the housing 10 has a plurality of non-radially extending apertures 72 therein. The end 11 of the housing also is provided with a series of apertures 73. During operation of the clutch, air may pass through the openings over the pressure plate and around the clutch elements, thus reducing their temperature and prolonging the life of the faces of the clutch elements.

The various elements forming the clutch are simple, sturdy, and can be readily assembled. Such parts as may need replacement may be readily removed and others substituted without special machining operations.

It will be understood that there may be variations made in the form of the various elements of the clutch and that the size and shape of the various parts may be varied without departing from the invention. Therefore, the embodiment of the clutch described above should be considered as illustrative only and not as limiting the scope of the following claims.

I claim:

1. A clutch comprising a housing, relatively shiftable clutch elements in said housing, means including a movable pressure member normally urging said clutch elements into engagement, a plurality of levers rockably supported on the exterior of said housing for withdrawing the pressure member to allow the clutch members to disengage, a plurality of link members pivotally connected to said pressure plate, and fulcrum elements comprising wedge-shaped followers on the link members adjustable axially of said link members and engaging said levers.

2. A clutch comprising relatively shiftable clutch elements, means including a movable pressure member normally urging said clutch elements into engagement, a housing for said clutch elements and said pressure member, a plurality of fulcrum members on the exterior of said housing and inclined inwardly at an angle to the said housing, levers for withdrawing said pressure member to allow disengagement of the clutch elements rockably supported on said fulcrum members whereby the centrifugal force generated during rotation of the clutch elements will urge the said levers into closer engagement with the said fulcrum members, links connecting the outer extremities of said levers to said pressure member, and resilient means engaging said levers inwardly of said fulcrum members and urging them in a direction to withdraw said pressure plate.

3. A clutch comprising relatively shiftable clutch elements, means including a movable pressure member normally urging said clutch elements into engagement, a housing for said clutch, a plurality of ball-like fulcrum members fixed to the exterior of said housing, levers for withdrawing said pressure member, semi-spherical sockets on said levers for receiving said fulcrum members and permitting substantially universal movement thereon, resilient means for maintaining the said levers in engagement with the said fulcrum members, means connecting the outer ends of said levers to said pressure member, and means engageable with the inner ends of said levers for rocking them about the fulcrum members to withdraw the pressure plate.

4. The clutch set forth in claim 3, in which the means connecting the outer ends of the levers to the pressure member comprise, links connected to said pressure member, fulcrum elements shiftable axially of said links and engaging said levers, resilient means for maintaining said levers in engagement with the said fulcrum elements, means for adjusting said fulcrum elements axially of said links to equalize the stress exerted on the said levers upon rocking thereof to withdraw the pressure plate.

5. A clutch comprising relatively shiftable clutch elements, means including a shiftable pressure member normally urging said clutch elements into engagement, a housing for said clutch elements and pressure plate, a plurality of hemispherical fulcrum elements on said housing, levers having hemispherical sockets engaging rockably mounted on said fulcrum elements for withdrawing said pressure plate, projections on said pressure plate engaging the said housing and connecting the housing and pressure plate for mutual rotation, links connecting the outer ends of the levers to said projections and springs supported on said housing engaging and tending to rock the levers about the fulcrums in the direction required to withdraw the pressure plate.

6. A clutch for disengageably connecting a drive shaft and a coaxial driven shaft comprising a housing having an inner clutch surface fixed to said drive shaft, a clutch member non-rotatably connected to and shiftable axially of said driven shaft between positions engaged with and disengaged from said clutch surface, means including a pressure plate normally urging said clutch member into engagement with said clutch surface, hemispherical fulcrum elements on said housing, levers mounted on said fulcrum elements for substantially universal movement relatively thereto and extending radially with respect to and having free inner ends adjacent said driven shaft, links connecting the outer ends of said levers to said pressure plate, and means shiftable axially of said shafts into engagement with the inner ends of said levers to withdraw the pressure plate and allow said clutch member to disengage from said clutch surface.

7. In a clutch including a housing, relatively shiftable clutch elements and a pressure member normally urging said clutch elements into engagement, the combination of a plurality of hemispherical fulcrum members fixed to the said housing, the axes of the said members being inclined inwardly towards the axis of the said clutch, a plurality of levers having cup-shaped portions receiving the inclined fulcrum members and substantially universally movable thereon and link means connecting the levers to the said pressure plate.

8. In a clutch including a housing, relatively shiftable clutch elements and a pressure member normally urging said clutch elements into engagement, the combination of a plurality of hemispherical fulcrum members fixed to the exterior of said housing, a plurality of levers having cup-shaped portions receiving the fulcrum members and substantially universally movable thereon and links pivotally connecting the pressure plate and said levers.

9. In a clutch including a housing, relatively shiftable clutch elements and a pressure member normally urging said clutch elements into engagement, the combination comprising a plurality of ball-like fulcrum members, a plurality of levers rockably mounted on said fulcrum members, links connected to the pressure plate, wedge-shaped fulcrum elements on the said links engaging said levers and resilient means normally urging said levers against the said ball-like and wedge-shaped fulcrum elements.

10. In a clutch including a housing, relatively shiftable clutch elements and a pressure member normally urging said clutch elements into engagement, means for withdrawing the pressure plate from contact with the clutch elements comprising a plurality of substantially hemispherical fulcrum members fixed to the said housing, a plurality of levers rockably mounted on the said fulcrum members, links pivotally connected to the said pressure plate, wedge-shaped fulcrum elements adjustably mounted on said links and engaging said levers, springs normally urging said levers against said wedge-shaped fulcrum elements and means for rocking said levers to withdraw the pressure plate.

11. A clutch comprising a housing, relatively shiftable clutch elements in said housing, a pressure member normally urging said clutch elements into engagement, fulcrum members on the housing, levers supported on the said fulcrum members for withdrawing the pressure member to allow the clutch members to disengage, link members connected to the pressure member, fulcrum elements on the link members and engaging the extremities of the said levers, and resilient means fixed on the housing for urging the levers against the fulcrum members and the lever extremities against the said fulcrum elements to minimize sliding movement therebetween.

12. A clutch comprising a housing, relatively shiftable clutch elements in said housing, a pressure member normally urging said clutch elements into engagement, fulcrum members on the housing, levers supported on the said fulcrum members for withdrawing the pressure member to allow the clutch members to disengage, link members pivotally connected to the pressure member, fulcrum elements on the link members and engaging the extremities of the said levers, and resilient means fixed on the housing for urging the lever extremities against the said fulcrum elements.

13. In a clutch, the combination of a flywheel having a disc-like portion formed with apertures therein elongated radially of said portion, an annular metallic member having a clutch face detachably secured to the said flywheel, a plurality of lugs on the said member disposed in the said elongated apertures in the said disc-like portion and engaging the sides thereof to prevent relative rotation therebetween, said apertures permitting expansion and contraction of said member responsive to temperature variation.

14. In a clutch, the combination of a flywheel having a disc-like portion formed with apertures therein, an annular metallic member having a clutch face, means in said apertures for detachably securing the said member to the said disc-like portion, the said means being of smaller dimensions radially of the said portion than the said apertures to permit of contraction and expansion of the said member relative to the said disc-like portion, in response to temperature variations, said means being in engagement with the sides of said apertures for preventing relative rotation of the members while permitting relative radial expansion therebetween.

BRUNO LOEFFLER.